US009034985B2

(12) United States Patent
Sommer et al.

(10) Patent No.: US 9,034,985 B2
(45) Date of Patent: *May 19, 2015

(54) AQUEOUS COATING SYSTEMS BASED ON PHYSICALLY DRYING URETHANE ACRYLATES

(75) Inventors: Stefan Sommer, Leverkusen (DE); Harald Blum, Hafenlohr (DE); Jürgen Lippemeier, Köln (DE); Miguel Fernandez, Barcelona (ES)

(73) Assignee: Bayer MaterialScience AG, Leverkusen (DE)

( * ) Notice: Subject to any disclaimer, the term of this patent is extended or adjusted under 35 U.S.C. 154(b) by 222 days.

This patent is subject to a terminal disclaimer.

(21) Appl. No.: 13/201,074

(22) PCT Filed: Jan. 30, 2010

(86) PCT No.: PCT/EP2010/000567
§ 371 (c)(1),
(2), (4) Date: Aug. 11, 2011

(87) PCT Pub. No.: WO2010/091797
PCT Pub. Date: Aug. 19, 2010

(65) Prior Publication Data
US 2012/0041145 A1 Feb. 16, 2012

(30) Foreign Application Priority Data
Feb. 13, 2009 (DE) .................. 10 2009 008 950

(51) Int. Cl.
| | |
|---|---|
| *C09D 175/06* | (2006.01) |
| *C09J 175/06* | (2006.01) |
| *C09D 175/16* | (2006.01) |
| *C08F 283/01* | (2006.01) |
| *C08G 18/42* | (2006.01) |
| *C08G 18/66* | (2006.01) |
| *C08G 18/67* | (2006.01) |
| *C08G 18/72* | (2006.01) |
| *C08G 18/75* | (2006.01) |
| *C08G 18/79* | (2006.01) |
| *C08G 18/08* | (2006.01) |
| *C08G 18/10* | (2006.01) |

(52) U.S. Cl.
CPC ............ *C09D 175/16* (2013.01); *C08F 283/01* (2013.01); *C08G 18/4208* (2013.01); *C08G 18/4213* (2013.01); *C08G 18/4219* (2013.01); *C08G 18/6659* (2013.01); *C08G 18/672* (2013.01); *C08G 18/724* (2013.01); *C08G 18/758* (2013.01); *C08G 18/792* (2013.01); *C08G 2170/80* (2013.01); *C08G 18/0823* (2013.01); *C08G 18/10* (2013.01)

(58) Field of Classification Search
None
See application file for complete search history.

(56) References Cited

U.S. PATENT DOCUMENTS

| | | | |
|---|---|---|---|
| 4,153,778 | A | 5/1979 | Park et al. |
| 4,722,966 | A | 2/1988 | Flakus |
| 5,135,963 | A | 8/1992 | Haeberle et al. |
| 5,684,081 | A | 11/1997 | Dannhorn et al. |
| 6,100,326 | A | 8/2000 | Richter et al. |
| 6,509,411 | B1 * | 1/2003 | Fieberg et al. ............... 524/591 |
| 6,635,723 | B1 | 10/2003 | Maier et al. |
| 8,114,920 | B2 | 2/2012 | Kim et al. |
| 2003/0162892 | A1 | 8/2003 | Maier et al. |
| 2004/0006152 | A1 | 1/2004 | Weikard et al. |
| 2006/0217497 | A1 | 9/2006 | Kitada et al. |
| 2008/0194775 | A1 | 8/2008 | Blum et al. |
| 2009/0053530 | A1 | 2/2009 | Sommer et al. |
| 2010/0075115 | A1 | 3/2010 | Tuerk et al. |

FOREIGN PATENT DOCUMENTS

| | | | |
|---|---|---|---|
| CA | 1061043 | A1 | 8/1979 |
| CA | 2159265 | A1 | 3/1996 |
| CA | 2253119 | A1 | 5/1999 |
| DE | 2446440 | A1 | 4/1976 |
| DE | 2912574 | A1 | 10/1979 |
| DE | 19746327 | C1 | 4/1999 |
| DE | 19934763 | A1 | 1/2001 |
| DE | 102007038085 | A1 | 2/2009 |
| EP | 98752 | A2 | 1/1984 |
| EP | 181486 | A1 | 5/1986 |
| EP | 209684 | A1 | 1/1987 |
| EP | 392352 | A2 | 10/1990 |
| EP | 0704469 | A2 | 4/1996 |
| EP | 753531 | A1 | 1/1997 |
| EP | 916647 | A2 | 5/1999 |
| EP | 0928799 | A1 | 7/1999 |
| WO | WO-2007/081186 | A1 | 7/2007 |
| WO | WO-2007/118781 | A1 | 10/2007 |
| WO | WO-2008/098972 | A1 | 8/2008 |

OTHER PUBLICATIONS

Oldring, P.K.T. (editor), *Reactive Diluents for UV and EB Curable Formulations* (1997), Chemistry & Technology of UV & EB Formulations for Coatings, Inks & Paints, vol. II, chapter III, Wiley and SITA Technology, pp. 239-306.

*Methoden der Organischen Chemie*, Houben-Weyl, 4th ed., vol. E20, part 2, Georg Thieme Verlag, 1997, p. 1682.

* cited by examiner

*Primary Examiner* — Randy Gulakowski
*Assistant Examiner* — Jeffrey Washville
(74) *Attorney, Agent, or Firm* — Drinker Biddle & Reath LLP

(57) ABSTRACT

The invention relates to radiation curable coating systems on the basis of aqueous polyurethane dispersions, to a method for the production thereof, to the use of the coating systems as paints and/or adhesives, and to objects and substrates provided with said paints and/or adhesives.

14 Claims, No Drawings

AQUEOUS COATING SYSTEMS BASED ON PHYSICALLY DRYING URETHANE ACRYLATES

CROSS-REFERENCE TO RELATED APPLICATIONS

This application is a national stage application (under 35 U.S.C. §371) of PCT/EP2010/000567, filed Jan. 30, 2010, which claims benefit of German application 10 2009 008 950.0, filed Feb. 13, 2009, both of which are incorporated herein by reference in their entirety for all their useful purposes.

BACKGROUND

The present invention describes radiation-curable coating systems based on aqueous polyurethane dispersions, a process for the preparation thereof, the use of the coating systems as lacquers and/or adhesives, and objects and substrates provided with these lacquers and/or adhesives.

Radiation-curable aqueous coating systems based on polyurethane polymers are used in the coating, inter alia, of wood, plastics and leather and are distinguished by a large number of positive properties, such as good resistance to chemicals and mechanical stability. A particular advantage is the split-second curing of the polyurethane top layer by crosslinking of the ethylenic double bonds contained in the polymer with the aid of high-energy radiation.

For many uses, such as e.g. in the lacquering of wood/furniture or plastics, marked physical surface drying after the water has been allowed to evaporate and before the radiation curing plays an exceptionally important role. Thus, coatings which, after the water has been allowed to evaporate, are touch dry and non-blocking and are not yet radiation cured can already be sanded, stacked and subjected to mechanical stress in diverse ways.

For pigmented lacquers a further significant advantage results if the coatings are already touch dry and non-blocking also in the state before radiation curing. Pigments, such as e.g. titanium dioxide, scatter and absorb UV radiation, and at a high pigment content can ensure that the radiation-induced polymerization proceeds incompletely in lower layers of the lacquer. In systems which are still tacky before radiation curing, this means that after radiation curing there is a soft or still viscous layer under the cured upper layer. Poor adhesion to the substrate and poor resistances to chemicals and colouring agents are the result. If the lower layer of a pigmented lacquer is firm per se and not tacky in spite of inadequate radiation curing, both the adhesion and the resistances become better.

The requirements of modern coating systems are very diverse. Thus not only is it of advantage if radiation-curable coating systems are non-blocking and touch dry after physical drying, rather after radiation curing a film should be obtained which is distinguished by high chemical resistances and good resistance to mechanical stress.

DE-A 2912574 describes water-dispersible urethane oligomers which are terminated by acrylic groups and are built up from polyisocyanates, di- or trimethylolcarboxylic acids, polytetramethylene diols, polycaprolactone polyols and monohydroxy-functional acrylates. These urethane oligomers are used as a textile coating, where a particular flexibility, elasticity and tensile strength are important.

EP-A 98752 describes a process for the preparation of aqueous polyurethane dispersions, which are obtained by reaction of diols with ionizable groups, polyester polyols, polyether polyols, diisocyanates and monohydroxy-functional acrylates.

EP-A 181486 claims aqueous dispersions of oligourethanes, which are crosslinkable by UV radiation, for the production of high-gloss lacquer coatings on leather, comprising polyether, polyester, polylactone or polycarbonate diols, anionic or nonionic compounds which are mono- or difunctional with respect to isocyanate groups, diisocyanates, low molecular weight diamines and/or diols and monohydroxy-functional acrylates. These systems are very flexible and elastic.

Aqueous emulsions based on ionic urethane-urea acrylates are described in EP-A 209684, which are characterized in that they comprise cycloaliphatic polyisocyanates, hydroxyalkyl acrylates, polyester polyol, polyether polyols and sodium salts of aminocarboxylic acids and are prepared by an acetone process.

EP-A 392352 describes aqueous dispersions of polyurethanes, which are crosslinkable with high-energy radiation, for coating flexible substrates. These are built up from polyisocyanates, high molecular weight polyols, low molecular weight polyols, polyamines, amino alcohols, an OH- or NH-functional compound having an ionizable group, monofunctional polyether polyols and compounds having ethylenically unsaturated groups and at least one hydroxyl group.

The five patents listed above are distinguished in that they provide systems for flexible and elastic coatings, with textiles as the preferred substrate. The polyester polyols built up from long-chain aliphatic polyols and/or di-acids are used as the flexibilizing builder component. The physical surface drying of the systems described is inadequate, and the resistances to chemicals are likewise not adequate. This manifests itself in particular in pigmented formulations.

EP-A 704469 describes water-dispersible, radiation-curable polyurethanes comprising a) polyisocyanates, b) polyester polyols, c) low molecular weight polyols, d) compounds having at least one group which is reactive towards isocyanate and at least one carboxyl group, e) a compound having at least one group which is reactive towards isocyanate and at least one copolymerizable unsaturated group and optionally f) an at least difunctional amine. In this context, at least components a), b) and e) must be reacted in one stage for the preparation of the polyurethane. Since these systems are employed in particular in textile coating, they must be very flexible.

Although it is prior art to build up radiation-curable polyurethane dispersions with the aid of polyester polyols, polyester polyols have thus hitherto preferably been used as flexibilizing builder components in that the polyesters were built up from long-chain and aliphatic polyols and/or di-acids. Such flexibilizing polyester polyols as units in a radiation-curable polyurethane dispersion lead to a low degree of physical drying and to inadequate resistances to colouring agents and solvents, especially in pigmented formulations.

The object was to provide radiation-curable coating systems which make rapid physical drying possible, are highly non-blocking after drying and make films which are very hard and resistant to chemicals possible after radiation curing. However, the films should not be brittle and should still be sufficiently flexible. This should apply to clear and pigmented lacquers.

It has been found, surprisingly, that radiation-curable aqueous dispersions of polyurethane acrylates give non-blocking coatings after a short drying time if these contain polyester polyols based on aromatic di- and/or tricarboxylic acids and aliphatic diols having 2 to 4 carbon atoms or aliphatic triols.

The films of these dispersions, both in clear lacquer and as pigmented lacquer, moreover achieve a high pendulum hardness after radiation curing, and prove to be very resistant to chemicals and colouring agents.

DESCRIPTION OF PREFERRED EMBODIMENTS

The invention relates to radiation-curable aqueous dispersions based on polyurethane acrylates (i) comprising as builder components A) one or more compounds of monohydroxy-functional alcohols containing (meth)acrylate groups,
B) polyester polyols obtainable from
  B1) aliphatic diols having 2 to 4 carbon atoms between the two OH functions and/or aliphatic triols and
  B2) aromatic di- and/or tricarboxylic acids,
C) optionally polyols which differ from A and B,
D) one or more compounds having at least one group which is reactive towards isocyanate, and additionally groups which are nonionic, ionic or capable of the formation of ionic groups, which have a dispersing action for the polyurethane dispersion,
E) organic polyisocyanates,
F) optionally compounds which differ from A to D and have at least one group which is reactive towards isocyanate.

In the context of this specification, "(meth)acrylate" relates to corresponding acrylate or methacrylate functions or to a mixture of the two.

The dispersion optionally contains a component ii, which comprises reactive diluents containing at least one group which can undergo free radical polymerization.

In this context, the builder component A and optionally component ii are employed in amounts such that the content of double bonds which can undergo free radical copolymerization is between 0.5 and 6.0, preferably between 1.0 and 5.5, particularly preferably between 1.5 and 5.0 mol/kg of non-aqueous constituents of the dispersion.

Builder component B is employed to the extent of 5-75, preferably to the extent of 10-50, particularly preferably to the extent of 15-40 wt. %, components A to F adding up to 100 wt. %.

Component ii is employed to the extent of 0-65, preferably to the extent of 0-40, particularly preferably to the extent of 0-35 wt. %, components i and ii adding up to 100 wt. %.

Component A comprises monohydroxy-functional alcohols containing (meth)acrylate groups. Such monohydroxy-functional alcohols containing (meth)acrylate groups are, for example, 2-hydroxyethyl (meth)acrylate, caprolactone-lengthened modifications of 2-hydroxyethyl (meth)acrylate, such as Pemcure® (Cognis, DE), 2-hydroxypropyl (meth)acrylate, 4-hydroxybutyl (meth)acrylate, 3-hydroxy-2,2-dimethylpropyl (meth)acrylate and the di-, tri- or penta(meth)acrylates, which are on average monohydroxy-functional, of polyhydric alcohols, such as trimethylolpropane, glycerol, pentaerythritol, ditrimethylolpropane, dipentaerythritol and ethoxylated, propoxylated or alkoxylated trimethylolpropane, glycerol, pentaerythritol, ditrimethylolpropane, dipentaerythritol or technical grade mixtures thereof.

Alcohols which can be obtained from the reaction of acids containing double bonds with monomeric epoxide compounds which optionally contain double bonds can moreover also be employed as monohydroxy-functional alcohols containing (meth)acrylate groups. Preferred reaction products are chosen from the group of (meth)acrylic acid with glycidyl (meth)acrylate or the glycidyl ester of a tertiary saturated monocarboxylic acid. Tertiary saturated monocarboxylic acids are, for example, 2,2-dimethylbutyric acid and ethylmethylbutyric, ethylmethylpentanoic, ethylmethylhexanoic, ethylmethylheptanoic and/or ethylmethyloctanoic acid.

Particularly preferred monohydroxy-functional alcohols containing (meth)acrylate groups are 2-hydroxyethyl (meth)acrylate, 2-hydroxypropyl (meth)acrylate, pentaerythritol triacrylate, dipentaerythritol pentaacrylate and the addition product of ethylmethylheptanoic acid glycidyl ester with (meth)acrylic acid and technical grade mixtures thereof. 2-Hydroxyethyl (meth)acrylate is very particularly preferred.

The monohydroxy-functional alcohols (A) containing (meth)acrylate groups can be used by themselves or also as mixtures.

Component B is hydroxyfunctional polyesters which are built up from aliphatic diols having 2 to 4 carbon atoms between the two OH functions (B1), such as, for example, 1,2-ethanediol, 1,2-propanediol, 1,3-propanediol, neopentyl glycol, 2-ethyl-2-butylpropanediol, 1,3-butanediol, 1,2- and 1,4-cyclohexanediol and/or 1,4-butanediol, and/or aliphatic triols (B1), such as, for example, trimethylolethane, trimethylolpropane, trimethylolbutane, glycerol and/or castor oil, and aromatic di- and/or tricarboxylic acids (B2), such as, for example, phthalic acid, phthalic anhydride, isophthalic acid, terephthalic acid and/or trimellitic acid and the anhydrides of the acids mentioned.

The aromatic di- and/or tri-acids (B2) can also be present in a mixture with aliphatic unsaturated di-acids, such as, for example, maleic acid, maleic anhydride, fumaric acid, tetrahydrophthalic acid and/or tetrahydrophthalic anhydride.

1,2-Ethanediol, 1,2-propanediol, 1,3-propanediol neopentyl glycol, trimethylolpropane, glycerol and/or castor oil (B1) and phthalic acid, phthalic anhydride, isophthalic acid and/or terephthalic acid (B2) are preferred as units for the polyester polyols (B).

1,2-Ethanediol, 1,2-propanediol, neopentyl glycol and/or trimethylolpropane (B1) and isophthalic acid and/or terephthalic acid (B2) are particularly preferred as units for the polyester polyols (B).

Builder component B) has an OH number of 20-500, preferably 40-400 and particularly preferably 70-390 mg of KOH/g of substance.

Component C comprises monomeric mono-, di- and/or triols in each case having a molecular weight of from 32 to 240 g/mol, such as e.g. methanol, ethanol, 1-propanol, 1-butanol, 1-pentanol, 1-hexanol, 2-propanol, 2-butanol, 2-ethylhexanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl-3-hydroxypropionic acid (2,2-dimethyl-3-hydroxypropyl ester), glycerol, trimethylolethane, trimethylolpropane and/or trimethylolbutane. Neopentyl glycol, 1,4-butanediol, 1,4-cyclohexanedimethanol, 1,6-hexanediol and/or trimethylolpropane are preferred.

Component C can furthermore comprise oligomeric and/or polymeric hydroxy-functional compounds, although these are less preferred since a flexibilization which at least partly eliminates the hardening effect of component B) is achieved by them. These oligomeric and/or polymeric hydroxy-functional compounds are, for example, polyesters, polycarbonates, C2-, C3- and/or C4-polyethers, polyether esters and polycarbonate polyesters having a functionality of from 1.0 to 3.0, in each case with a weight average of the molar mass $M_w$ in the range of from 300 to 4,000, preferably 500 to 2,500 g/mol.

Hydroxy-functional polyester alcohols are those based on aliphatic and/or cycloaliphatic dicarboxylic acids with monomeric di- and triols, such as have already been listed as component C, and polyester alcohols based on lactones.

Hydroxy-functional polyether-ols are obtainable, for example, by polymerization of cyclic ethers or by reaction of alkylene oxides with a starter molecule.

Hydroxy-functional polycarbonates are hydroxyl-terminated polycarbonates, the polycarbonates accessible by reaction of diols, lactone-modified diols or bisphenols, e.g. bisphenol A, with phosgene or carbonic acid diesters, such as diphenyl carbonate or dimethyl carbonate.

Component D includes ionic groups, which can be either cationic or anionic in nature, and/or nonionic hydrophilic groups. Compounds having a cationic, anionic or nonionic dispersing action are those which contain, for example, sulfonium, ammonium, phosphonium, carboxylate, sulfonate or phosphonate groups or the groups which can be converted into the abovementioned groups by salt formation (potentially ionic groups), or polyether groups and can be incorporated into the macromolecules by the isocyanate-reactive groups present. Hydroxyl and amine groups are isocyanate-reactive groups which are preferably suitable.

Suitable anionic or potentially anionic compounds (D) are, for example, mono- and dihydroxycarboxylic acids, mono- and diaminocarboxylic acids, mono- and dihydroxysulfonic acids, mono- and diaminosulfonic acids, mono- and dihydroxyphosphonic acids, mono- and diaminophosphonic acids and their salts, such as dimethylolpropionic acid, dimethylolbutyric acid, hydroxypivalic acid, N-(2-aminoethyl)-alanine, 2-(2-amino-ethylamino)ethanesulfonic acid, ethylenediamine-propyl- or -butylsulfonic acid, 1,2- or 1,3-propylenediamine-ethylsulfonic acid, 3-(cyclohexylamino)propane-1-sulfonic acid, malic acid, citric acid, glycolic acid, lactic acid, glycine, alanine, taurine, lysine, 3,5-diaminobenzoic acid, an addition product of isophoronediamine (1-amino-3,3,5-trimethyl-5-aminomethylcyclohexane or IPDA) and acrylic acid (EP-A 916 647, Example 1), the adduct of sodium bisulfite on but-2-ene-1,4-diol, polyether sulfonate and the propoxylated adduct of 2-butenediol and $NaHSO_3$, such as is described in DE-A 2 446 440 on page 5-9, formula I-III. Suitable cationic units or units which can be converted into cationic groups are, for example, ethanolamine, diethanolamine, triethanolamine, 2-propanolamine, dipropanolamine, tripropanolamine, N-methylethanolamine, N-methyl-diethanolamine and N,N-dimethylethanolamine.

Particularly preferred ionic or potentially ionic compounds (D) are those which contain carboxyl and/or sulfonate groups as ionic groups, such as 2-(2-amino-ethylamino)-sulfonic acid, 3-(cyclohexylamino)propane-1-sulfonic acid, the addition product of isophoronediamine and acrylic acid (EP 916 647 A1, Example 1), hydroxypivalic acid and/or dimethylolpropionic acid, and those which contain tertiary amines, such as triethanolamine, tripropanolamine, N-methyldiethanolamine and/or N,N-dimethylethanolamine.

Very particularly preferred ionic or potentially ionic compounds (D) are hydroxypivalic acid and/or dimethylolpropionic acid.

Suitable compounds having a nonionic hydrophilizing action are, for example, polyoxyalkylene ethers which contain at least one hydroxyl or amino group. These polyethers contain a content of from ≥30 wt. % to ≤100 wt. % of units which are derived from ethylene oxide. Possible compounds are polyethers of linear structure having a functionality of between ≥1 and ≤3, and also compounds of the general formula (I)

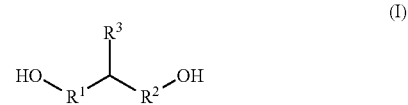

in which $R^1$ and $R^2$ independently of each other each denote a divalent aliphatic, cycloaliphatic or aromatic radical having 1 to 18 C atoms, which can be interrupted by oxygen and/or nitrogen atoms, and $R^3$ represents an alkoxy-terminated polyethylene oxide radical.

Compounds having a nonionic hydrophilizing action are also, for example, monofunctional polyalkylene oxide polyether alcohols containing, as a statistical average, ≥5 to ≤70, preferably ≥7 to ≤55 ethylene oxide units per molecule, such as are accessible by alkoxylation of suitable starter molecules.

Suitable starter molecules are, for example, saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, such as, for example, diethylene glycol monobutyl ether, unsaturated alcohols, such as allyl alcohol, 1,1-dimethylallyl alcohol or oleyl alcohol, aromatic alcohols, such as phenol, the isomeric cresols or methoxyphenols, araliphatic alcohols, such as benzyl alcohol, anisyl alcohol or cinnamyl alcohol, secondary monoamines, such as dimethylamine, diethylamine, dipropylamine, diisopropylamine, dibutylamine, bis-(2-ethylhexyl)-amine, N-methyl- and N-ethylcyclohexylamine or dicyclohexylamine, and heterocyclic secondary amines, such as morpholine, pyrrolidine, piperidine or 1H-pyrazole. Preferred starter molecules are saturated monoalcohols. Diethylene glycol monobutyl ether is particularly preferably used as the starter molecule.

Alkylene oxides which are suitable for the alkoxylation reaction are, in particular, ethylene oxide and propylene oxide, which can be employed in the alkoxylation reaction in any desired sequence or also in a mixture.

The polyalkylene oxide polyether alcohols are either pure polyethylene oxide polyethers or mixed polyalkylene oxide polyethers, the alkylene oxide units of which include ethylene oxide units to the extent of ≥30 mol %, preferably to the extent of ≥40 mol %. Preferred nonionic compounds are monofunctional mixed polyalkylene oxide polyethers which contain ≥40 mol % of ethylene oxide units and ≤60 mol % of propylene oxide units.

The acids mentioned under component D are converted into the corresponding salts by reaction with neutralizing agents, such as triethylamine, ethyldiisopropylamine, dimethylcyclohexylamine, dimethylethanolamine, ammonia, N-ethylmorpholine, LiOH, NaOH and/or KOH. In this context, the degree of neutralization is preferably between 50 and 125%.

The bases mentioned under component D are converted into the corresponding salts by reaction with neutralizing agents, such as e.g. inorganic acids, such as, for example, hydrochloric acid, phosphoric acid and/or sulfuric acid, and/ or organic acids, such as, for example, formic acid, acetic acid, lactic acid, methanesulfonic acid, ethanesulfonic acid and/or p-toluenesulfonic acid. In this context, the degree of neutralization is preferably between 50 and 125%.

The compounds listed under component D can also be used in mixtures.

The ionic hydrophilization and the combination of ionic and nonionic hydrophilization are preferred over the purely nonionic hydrophilization.

Component E comprises polyisocyanates chosen from the group of aromatic, araliphatic, aliphatic or cycloaliphatic polyisocyanates or mixtures of such polyisocyanates. Suitable polyisocyanates are e.g. 1,3-cyclohexane-diisocyanate, 1-methyl-2,4-diisocyanato-cyclohexane, 1-methyl-2,6-diisocyanato-cyclohexane, tetramethylene-diisocyanate, 4,4'-diisocyanatodiphenylmethane, 2,4'-diisocyanatodiphenylmethane, 2,4-diisocyanatotoluene, 2,6-diisocyanatotoluene, α,α,α,α'-tetramethyl-m- or -p-xylylene-diisocyanate, 1,6-hexamethylene-diisocyanate, 1-isocyanato-3,3,5-trimethyl-5-isocyanatomethylcyclohexane (isophorone-diisocyanate or IPDI), 4,4'-diisocyanato-dicyclohexylmethane, 4-isocyanatomethyl-1,8-octane-diisocyanate (triisocyanatononane, TIN) (EP-A 928 799) and mixtures thereof. Homologues and oligomers of these polyisocyanates listed with biuret, carbodiimide, isocyanurate, allophanate, iminooxadiazinedione and/or uretdione groups, mixtures thereof with one another and mixtures with the polyisocyanates listed above are likewise suitable. 1,6-Hexamethylene-diisocyanate, 1-isocyanato-3,3,5-trimethyl-5-isocyanatomethylcyclohexane (isophorone-diisocyanate or IPDI) and 4,4'-diisocyanato-dicyclohexylmethane and mixtures thereof with one another are preferred. Homologues and oligomers of 1-isocyanato-3,3,5-trimethyl-5-isocyanatomethylcyclohexane (isophorone-diisocyanate or IPDI) and 4,4'-diisocyanato-dicyclohexylmethane with biuret, carbodiimide, isocyanurate, allophanate, iminooxadiazinedione and/or uretdione groups, mixtures thereof with one another and mixtures with the preferred polyisocyanates listed above are likewise preferred.

Mono- and diamines and/or mono- or difunctional amino alcohols are used as component F to increase the molar mass. Preferred diamines are those which are more reactive towards the isocyanate groups than water, since the lengthening of the polyester-urethane (meth)acrylates optionally takes place in an aqueous medium. The diamines are particularly preferably chosen from the group of ethylenediamine, 1,6-hexamethylenediamine, isophoronediamine, 1,3- and 1,4-phenylenediamine, 4,4'-diphenylmethanediamine, amino-functional polyethylene oxides, amino-functional polypropylene oxides (known under the name Jeffamin® D series [Huntsman Corp. Europe, Zavantem, Belgium]) and hydrazine. Ethylenediamine is very particularly preferred.

Preferred monoamines are chosen from the group of butylamine, ethylamine and amines of the Jeffamin® M series (Huntsman Corp. Europe, Zavantem, Belgium), amino-functional polyethylene oxides, amino-functional polypropylene oxides and/or amino alcohols.

Component ii comprises reactive diluents, by which are to be understood compounds which contain at least one group which can undergo free radical polymerization, preferably acrylate and methacrylate groups, and preferably no groups which are reactive towards isocyanate or hydroxyl groups.

Preferred compounds ii contain 2 to 6 (meth)acrylate groups, particularly preferably 4 to 6.

Particularly preferred compounds ii have a boiling point of more than 200° C. under normal pressure.

Reactive diluents are described generally in P. K. T. Oldring (editor), Chemistry & Technology of UV & EB Formulations for Coatings, Inks & Paints, vol. II, chapter III: Reactive Diluents for UV & EB Curable Formulations, Wiley and SITA Technology, London 1997.

Reactive diluents are, for example, the alcohols methanol, ethanol, 1-propanol, 1-butanol, 1-pentanol, 1-hexanol, 2-propanol, 2-butanol, 2-ethylhexanol, dihydrodicyclopentadienol, tetrahydrofurfuryl alcohol, 3,3,5-trimethylhexanol, octanol, decanol, dodecanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), glycerol, trimethylolethane, trimethylolpropane, trimethylolbutane, pentaerythritol, ditrimethylolpropane, dipentaerythritol and sorbitol esterified completely with (meth)acrylic acid, and ethoxylated and/or propoxylated derivatives of the alcohols listed and the technical grade mixtures obtained during (meth)acrylation of the abovementioned compounds.

Component ii is preferably chosen from the group of (meth)acrylates of tetrols and hexols, such as (meth)acrylates of pentaerythritol, ditrimethylolpropane, dipentaerythritol, sorbitol, ethoxylated, propoxylated or alkoxylated pentaerythritol, ditrimethylolpropane, dipentaerythritol, sorbitol and ethoxylated and/or propoxylated derivatives of the alcohols listed, and the technical grade mixtures obtained during (meth)acrylation of the abovementioned compounds.

All the processes known from the prior are can be used for the preparation of the dispersions according to the invention, such as emulsifier-shearing force, acetone, prepolymer mixing, melt emulsification, ketimine and solid spontaneous dispersing processes or derivatives thereof. A summary of these methods is found in Methoden der Organischen Chemie, Houben-Weyl, 4th edition, volume E20/part 2 on page 1682, Georg Thieme Verlag, Stuttgart, 1987. The melt emulsification and the acetone process are preferred. The acetone process is particularly preferred.

The invention also provides a process for the preparation of radiation-curable aqueous dispersions based on polyurethane acrylates (i), characterized in that a polyurethane acrylate prepolymer (i) is obtained by reaction of components A-D with component E in one or more reaction steps, it being possible for a neutralizing agent to be added before, during or after the preparation of the prepolymer to produce the ionic groups necessary for the dispersing operation, followed by a dispersing step by addition of water to the prepolymer or transfer of the prepolymer into an aqueous reservoir, it being possible for chain lengthening by means of component F to be carried out before, during or after the dispersing.

The invention also provides a process according to the above description, in which one or more reactive diluents containing at least one group which can undergo free radical polymerization (component ii) are admixed.

For preparation of the reaction product, components A, B, C and D are initially introduced into the reactor and optionally diluted with acetone. Component ii can optionally also be added to components A to D. To accelerate the addition on to the isocyanate, isocyanate addition reaction catalysts, such as, for example, triethylamine, 1,4-diazabicyclo-[2,2,2]-octane, tin dioctoate or dibutyltin dilaurate, can be added and the mixture can be heated in order to enable the reaction to start. Temperatures of from 30 to 60° C. are as a rule necessary for this. The polyisocyanate or polyisocyanates is or are then metered in. The reverse variant is also possible, the polyisocyanates (E) then being initially introduced and the isocyanate-reactive components A, B, C and D being added. Components A, B, C and D can also be added successively and in any desired sequence. Stepwise reaction of the components is likewise possible, that is to say the separate reaction of component E with one or more isocyanate-reactive components A, B, C and/or D before the adduct obtained is reacted further with the components which have not yet been used.

To monitor the reaction, the NCO content is determined at regular intervals via titration or infra-red or near infra-red spectroscopy.

The molar ratios of isocyanate groups in E to groups in A, B, C and D which are reactive towards isocyanates are from 0.8:1 to 2.5:1, preferably 1.2:1 to 1.5:1.

After the preparation of the product (i) from components A, B, C, D and E by the process according to the invention, salt formation of the centres of the compounds D which have an ionic dispersing action takes place, if this has not yet been carried out in the starting molecules. In the case where component D contains acidic groups, bases chosen from the group of triethylamine, ethyldiisopropylamine, dimethylcyclohexylamine, dimethylethanolamine, ammonia, N-ethylmorpholine, LiOH, NaOH and/or KOH are preferably employed. In the case where component D contains basic groups, acids chosen from the group of lactic acid, acetic acid, phosphoric acid, hydrochloric acid and/or sulfuric acid are preferably employed. If compounds containing only ether groups are employed as component D, this neutralization step is omitted.

Thereafter, a reactive diluent ii or a mixture of reactive diluents ii can optionally be added. Component ii is preferably admixed in at 30-45° C. As soon as this has dissolved, the last reaction step in which an increase in the molar mass and the formation of the dispersions required for the coating system according to the invention take place optionally follows. The polyurethane synthesized from components A), B), C), D) and E) and optionally the reactive diluent or diluents ii optionally dissolved in acetone are either introduced into the dispersing water, which contains the amine or amines (F), with vigorous stirring, or, conversely, the dispersing water/amine mixture is stirred into the polyurethane solution. The dispersions contained in the coating system according to the invention are moreover formed. The amount of amine (F) employed depends on the unreacted isocyanate groups still present. The reaction of the still free isocyanate groups with the amine (F) can take place to the extent of 35% to 150%. In the case where a deficiency of amine (F) is employed, still free isocyanate groups react slowly with water. If an excess of amine (F) is used, unreacted isocyanate groups are no longer present and an amine-functional polyurethane is obtained. Preferably, 80% to 110%, particularly preferably 90% to 100% of the still free isocyanate groups are reacted with the amine (F).

In a further variant, it is possible for the increase in the molar mass by the amine (F) already to be carried out in acetone solution, i.e. before the dispersing and optionally before or after the addition of the reactive diluent or diluents (ii).

In a further variant, it is possible to carry out the increase in molar mass by the amine (F) after the dispersing step.

If desired, the organic solvent—if present—can be distilled off. The dispersions then have a solids content of from 20 to 60 wt. %, in particular 30 to 58 wt. %.

It is likewise possible to carry out the dispersing and distillation step in parallel, that is to say simultaneously or at least partly simultaneously.

The invention also provides the use of the radiation-curable aqueous dispersions according to the invention for the production of coatings, in particular of lacquers and adhesives.

After removal of the water by conventional methods, such as heat, thermal radiation, moving optionally dried air and/or microwaves, the dispersions according to the invention give clear films. The films cure by subsequent crosslinking induced by radiation chemistry and/or free radicals to give lacquer coating which are particularly high-quality and resistant to chemicals.

Electromagnetic radiation of which the energy, optionally with the addition of suitable photoinitiators, is sufficient to effect free radical polymerization of (meth)acrylate double bonds is suitable for polymerization induced by radiation chemistry.

The polymerization induced by radiation chemistry is preferably carried out by means of radiation with a wavelength of less than 400 nm, such as UV, electron, x- or gamma rays. UV radiation is particularly preferred, the curing with UV radiation being initiated in the presence of photoinitiators. A distinction is made in principle between two type of photoinitiators, the unimolecular (type I) and the bimolecular (type II). Suitable (type I) systems are aromatic ketone compounds, such as e.g. benzophenones in combination with tertiary amines, alkylbenzophenones, 4,4'-bis(dimethylamino)benzophenone (Michler's ketone), anthrone and halogenated benzophenones or mixtures of the types mentioned. (Type II) initiators, such as benzoin and its derivatives, benzil ketals, acylphosphine oxides, 2,4,6-trimethyl-benzoyl-diphenylphosphine oxide, bisacylphosphine oxides, phenylglyoxylic acid esters, camphorquinone, α-aminoalkylphenones, α,α-dialkoxyacetophenones and α-hydroxyalkylphenones, are furthermore suitable. Photoinitiators which can easily be incorporated into aqueous coating compositions are preferred. Such products are, for example, Irgacure® 500 (a mixture of benzophenone and (1-hydroxycyclohexyl)phenyl ketone, Ciba, Lampertheim, DE), Irgacure® 819 DW (phenyl-bis-(2,4,6-trimethylbenzoyl)-phosphine oxide, Ciba, Lampertheim, DE) and Esacure® KIP EM (oligo-[2-hydroxy-2-methyl-1-[4-(1-methylvinyl)-phenyl]-propanone], Lamberti, Aldizzate, Italy). Mixtures of these compounds can also be employed.

Polar solvents, such as e.g. acetone and isopropanol, can also be employed for incorporation of the photoinitiators.

The UV curing is advantageously carried out at 30-70° C., because the degree of conversion of (meth)acrylate groups tends to be increased at a higher temperature. This can result in better resistance properties. Nevertheless, a possible heat-sensitivity of the substrate must be taken into consideration during UV curing, so that optimum curing conditions for a particular coating composition/substrate combination are to be determined by the person skilled in the art in simple preliminary experiments.

In this context, the radiation emitter or emitters which initiate the free radical polymerization can be fixed in position and the coated substrate is moved past the emitter by suitable conventional devices, or the radiation emitters can be moved by conventional devices, so that the coated substrates are fixed in position during the curing. It is also possible to carry out the irradiation e.g. in chambers, where the coated substrate is introduced into the chamber and the radiation is then switched on for a certain period of time, and after the irradiation the substrate is removed from the chamber again.

If appropriate, curing is carried out under an inert gas atmosphere, i.e. with exclusion of oxygen, in order to prevent inhibition of the free radical crosslinking by oxygen.

If the curing is carried out thermally by free radicals, water-soluble peroxides or aqueous emulsions of initiators which are not water-soluble are suitable. These agents which form free radicals can be combined with accelerators in a known manner.

The coating systems according to the invention can be applied to the most diverse substrates by the conventional techniques, preferably spraying, rolling, flooding, printing, knife-coating, pouring, brushing and dipping.

In principle, all substrates can be lacquered or coated with the coating systems according to the invention. Preferred substrates are chosen from the group consisting of mineral bases, wood, wood materials, furniture, parquet flooring, doors, window frames, metallic objects, plastics, paper, cardboard, cork, mineral substrates, textiles or leather. They are suitable here as a primer and/or as a top lacquer. In addition, the coating systems according to the invention can also be employed in or as adhesives, e.g. in contact adhesives, in heat-activated adhesives or in laminating adhesives.

The coating systems according to the invention can be employed by themselves and also in binder mixtures with other dispersions. These can be dispersions which likewise contain unsaturated groups, such as e.g. dispersion which contain unsaturated polymerizable groups and are based on polyester, polyurethane, polyepoxy(meth)acrylate, polyether, polyamide, polysiloxane, polycarbonate, epoxyacrylate, polymers, polyester acrylate, polyurethane polyacrylate and/or polyacrylate.

The coating systems according to the invention can also comprise those dispersions based on polyesters, polyurethanes, polyethers, polyamides, polyvinyl esters, polyvinyl ethers, polysiloxanes, polycarbonates and/or polyacrylates which contain functional groups, such as alkoxysilane groups, hydroxyl groups and/or isocyanate groups optionally present in blocked form. Dual cure systems which can be cured via two different mechanisms can thus be prepared.

So-called crosslinking agents can furthermore likewise be added to the coating system according to the invention for dual cure systems. Non-blocked and/or blocked polyisocyanates, polyaziridines, polycarbodiimides and melamine resins are preferably possible. Non-blocked and/or blocked hydrophilized polyisocyanates are particularly preferred for aqueous coating compositions. Preferably, ≤20 wt. %, particularly preferably ≤10 wt. % of solid crosslinking agent, based on the solids content of the coating composition, is added.

The coating systems according to the invention can also comprise dispersions based on polyesters, polyurethanes, polyethers, polyamides, polysiloxanes, polyvinyl ethers, polybutadienes, polyisoprenes, chlorinated rubbers, polycarbonates, polyvinyl esters, polyvinyl chlorides or polyacrylates or a polyurethane polyacrylate, polyester acrylate, polyether acrylate, alkyd, polycarbonate, polyepoxy or epoxy (meth)acrylate basis which contain no functional groups. The degree of crosslinking density can thus be reduced, the physical drying can be influenced, e.g. accelerated, or an elastification or also an adjustment of the adhesion can be carried out.

Coating compositions which comprise the coating systems according to the invention, amino crosslinking resins, on a melamine or urea basis, and/or polyisocyanates with free or with blocked polyisocyanate groups, based on polyisocyanates, optionally containing hydrophilizing groups, from hexamethylene-diisocyanate, isophorone-diisocyanate and/or toluoylidene-diisocyanate with urethane, uretdione, iminooxadiazinedione, isocyanurate, biuret and/or allophanate structure can also be added into the coating systems according to the invention. Carbodiimides or polyaziridines are also possible as further crosslinking agents.

The binders, auxiliary substances and additives known in lacquer technology, such as e.g. pigments, dyestuffs or matting agents, can be added to or combined with the coating systems according to the invention. These are flow and wetting additives, slip additives, pigments, including metallic effect pigments, fillers, nanoparticles, light stabilizer particles, anti-yellowing additives, thickeners and additives for reducing surface tension.

The coating systems according to the invention are suitable for coatings on films, deformation of the coated film taking place between the physical drying and UV curing.

The coating systems according to the invention are particularly suitable for clear lacquer uses on substrates of wood and plastic, where blocking resistance after physical drying and good resistances to chemicals after radiation curing are important.

The coating systems according to the invention with a pigment content of ≥10 wt. %, based on the total formulation, are likewise particularly suitable for uses on wood and plastics. If an incomplete reaction of the radiation-curable groups in the coating system occurs during the radiation curing because the pigment contents are too high, non-blocking coatings are obtained.

The present invention likewise provides coating compositions comprising the radiation-curable aqueous dispersions according to the invention based on polyurethane acrylate, and crosslinking agents based on amino resins, blocked polyisocyanates, non-blocked polyisocyanates, polyaziridines and/or polycarbodiimides, and/or one or more further dispersions.

This invention also provides substrates coated with the coating systems according to the invention.

EXAMPLES

The NCO content was in each case monitored titrimetrically in accordance with DIN 53185.

The solids content was determined gravimetrically after all the non-volatile constituents had been evaporated off, in accordance with DIN 53216.

The average particle size was determined by laser correlation spectroscopy.

Example 1

Preparation of a Polyester According to the Invention, Component B 6,574 parts of isophthalic acid, component B2, 1,327 parts of trimethylolpropane, component B1, 7,207 parts of neopentyl glycol, component B1, and 4 parts of Fascat® 4100 (butylstannonic acid, Arcema Inc., Philadelphia, Pa., USA) were heated up together to 190° C., while stirring. This temperature was maintained until an acid number of less than 1.5 mg of KOH/g of substance was reached. A polyester having an average functionality of 2.3 and a hydroxyl number of 365 mg of KOH/g of substance was obtained.

Example 2

Preparation of a Polyester According to the Invention, Component B 1,661 parts of isophthalic acid, component B2, 1,661 parts of terephthalic acid, component B2, 782 parts of ethylene glycol, component B1, 1,206 parts of neopentyl glycol, component B1, and 1.5 parts of Fascat® 4100 (butylstannonic acid, Arcema Inc., Philadelphia, Pa., USA) were heated up together to 190° C., while stirring. This temperature was maintained until an acid number of less than 1.5 mg of KOH/g of substance was reached. A polyester having an average functionality of 2.0 and a hydroxyl number of 99 mg of KOH/g of substance was obtained.

Example 3

Preparation of a Polyester According to the Invention, Component B 1,480 parts of phthalic anhydride, component B2, and 985 parts of ethylene glycol, component B1, were heated up together to 220° C., while stirring. This temperature was maintained until an acid number of less than 1.5 mg of KOH/g of substance was reached. A polyester having an average functionality of 2.0 and a hydroxyl number of 288 mg of KOH/g of substance was obtained.

Example 4

Preparation of a Polyester which is not According to the Invention, Component B 1,460 parts of adipic acid, component B2, 219 parts of trimethylolpropane, component B1, and 1,435 parts of neopentyl glycol, component B1, were heated up together to 220° C., while stirring. This temperature was maintained until an acid number of less than 1.5 mg of KOH/g of substance was reached. A polyester having an average functionality of 2.3 and a hydroxyl number of 255 mg of KOH/g of substance was obtained.

Example 5

Preparation of the Polyester from EP-A 704469, Example 1

1,503 parts of isophthalic acid, 1,321 parts of adipic acid and 2,413 parts of hexanediol were heated up together to 220° C., while stirring. This temperature was maintained until an acid number of less than 1.5 mg of KOH/g of substance was reached. A polyester having an average functionality of 2.0 and a hydroxyl number of 46 mg of KOH/g of substance was obtained.

Example 6

Preparation of a UV-Curable Aqueous Polyurethane Dispersion According to the Invention 1,595 parts of 2-hydroxyethyl acrylate, component A, were metered into a mixture of 2,236 parts of 4,4'-diisocyanatodicyclohexylmethane, component E, 2,244 parts of Desmodur® N 3300 (HDI trimer, Bayer AG, Leverkusen, DE), component E, and 0.75 part of dibutyltin dilaurate in 1,519 parts of acetone at 60° C. and the mixture was stirred further at 60° C. until an NCO content of 8.2 wt. % was reached. 1,373 parts of the polyesters from Example 1), component B, dissolved in 421 parts of acetone, 305 parts of dimethylolpropionic acid, component D, and 0.75 part of dibutyltin dilaurate were then added at 40° C. and the mixture was heated up to 60° C., while stirring. When an NCO content of 0.6 wt. % was reached, the mixture was cooled to 40° C., and neutralization with 147 parts of triethylamine followed. The clear solution was introduced into 11,350 parts of water, while stirring. Thereafter, a mixture of 43.6 parts of ethylenediamine, component F, and 100 parts of water was added to the dispersion, while stirring. The acetone was then distilled off from the dispersion under a slight vacuum. A UV-curable aqueous polyurethane dispersion 6) according to the invention having a solids content of 43 wt. %, an average particle size of 132 nm and a pH of 8.5 was obtained.

Example 7

Preparation of a UV-Curable Aqueous Polyurethane Dispersion According to the Invention 410 parts of Desmodur® N 3300 (HDI trimer, Bayer AG, Leverkusen, DE), component E, 0.3 part of p-methoxyphenol and 0.006 part of dibutyltin dilaurate were dissolved in 143 parts of acetone. Addition of 163 parts of 2-hydroxyethyl acrylate, component A, was carried out at 60° C. When an NCO content of 4.1 wt. % was reached, the mixture was cooled to 40° C. and 435 parts of an 80% strength acetone solution of the polyester from Example 2), component B, 47 parts of dimethylolpropionic acid, component D, 92 parts of 4,4'-diisocyanatodicyclohexylmethane, component E, 110 parts of acetone and 0.5 part of dibutyltin dilaurate were added. The mixture was then stirred at 60° C. until an NCO content of 0.9 wt. % was reached, cooled to 40° C. and neutralized with 25 parts of dimethylethanolamine, and 1,400 parts of water were added, while stirring. Thereafter, a mixture of 7.0 parts of ethylenediamine, component F, and 50 parts of acetone was added to the dispersion, while stirring. The acetone was then distilled off from the dispersion under a slight vacuum. A UV-curable aqueous polyurethane dispersion 7) according to the invention having a solids content of 42 wt. %, an average particle size of 93 nm and a pH of 8.6 was obtained.

Example 8

Preparation of a UV-Curable Aqueous Polyurethane Dispersion According to the Invention 927 parts of the polyester from Example 3), component B, were melted at 65° C. and dissolved in 1,900 parts of acetone. 2,047 parts of 2-hydroxyethyl acrylate, component A, 305 parts of dimethylolpropionic acid, component D, 2,236 parts of 4,4'-diisocyanatodicyclohexylmethane, component E, and 1.5 parts of dibutyltin dilaurate were then added at 40° C. and the mixture was heated up to 60° C., while stirring. Addition of 2,244 parts of Desmodur® N 3300 (HDI trimer, Bayer AG, Leverkusen, DE), component E, followed. When an NCO content of 0.6 wt. % was reached, the mixture was cooled to 40° C., and neutralization with 173 parts of triethylamine followed. The clear solution was introduced into 11,350 parts of water, while stirring. Thereafter, a mixture of 35.5 parts of ethylenediamine, component F, and 100 parts of water was added to the dispersion, while stirring. The acetone was then distilled off from the dispersion under a slight vacuum. A UV-curable aqueous polyurethane dispersion 8) according to the invention having a solids content of 41 wt. %, an average particle size of 117 nm and a pH of 8.3 was obtained.

Example 9

Preparation of a UV-Curable Aqueous Polyurethane Dispersion According to the Invention 298 parts of pentaerythritol triacrylate, component A, 116 parts of 2-hydroxyethyl acrylate, component A, 1,427 parts of an 80% strength acetone solution of the polyester from Example 2), component B, and 134 parts of dimethylolpropionic acid, component D, were dissolved in 930 parts of acetone. Addition of 269 parts of hexamethylene-diisocyanate, component E, 269 parts of toluene-2,4-diisocyanate, component E, and 0.4 part of tin di(ethylhexanoate) followed. The mixture was then heated to 60° C., while stirring, and cooled to 40° C. only after an NCO content of 0.9 wt. % was reached. Neutralization with 81 parts of triethylamine and, after dilution with a further 290 parts of acetone, addition of 23.1 parts of ethylenediamine, component F, followed. 2,200 parts of water were introduced into the clear solution, while stirring. The acetone was then distilled off from the dispersion under a slight vacuum. A UV-curable aqueous polyurethane dispersion 9) according to the invention having a solids content of 41 wt. %, an average particle size of 33 nm and a pH of 7.0 was obtained.

Example 10

Preparation of a UV-Curable Aqueous Polyurethane Dispersion According to the Invention 1,595 parts of 2-hydroxyethyl acrylate, component A, were metered into a mixture of 2,236 parts of 4,4'-diisocyanatodicyclohexylmethane, component E, 2,244 parts of Desmodur® N 3300 (HDI trimer, Bayer AG, Leverkusen, DE), component E, and 0.75 part of dibutyltin dilaurate in 1,519 parts of acetone at 60° C. and the mixture was stirred further at 60° C. until an NCO content of 8.2 wt. % was reached. 1,373 parts of the polyesters from Example 1), component B, dissolved in 421 parts of acetone, 305 parts of dimethylolpropionic acid, component D, and 0.75 part of dibutyltin dilaurate were then added at 40° C. and the mixture was heated up to 60° C., while stirring. When an NCO content of 0.6 wt. % was reached, the mixture was cooled to 40° C., and neutralization with 147 parts of triethylamine and addition of 795 parts of the ditrimethylolpropane tetraacrylate Ebecryl® 140 (Cytec Surface Specialties SA/NY, Drogenbos, Belgium), component ii, followed. The clear solution was introduced into 12,860 parts of water, while stirring. Thereafter, a mixture of 43.6 parts of ethylenediamine, component F, and 100 parts of water was added to the dispersion, while stirring. The acetone was then distilled off from the dispersion under a slight vacuum. A UV-curable aqueous polyurethane dispersion 10) according to the invention having a solids content of 43 wt. %, an average particle size of 140 nm and a pH of 8.4 was obtained.

Example 11

Preparation of a UV-Curable Aqueous Polyurethane Dispersion According to the Invention 1,595 parts of 2-hydroxyethyl acrylate, component A, were metered into a mixture of 2,236 parts of 4,4'-diisocyanatodicyclohexylmethane, component E, 2,244 parts of Desmodur® N 3300 (HDI trimer, Bayer AG, Leverkusen, DE), component E, and 0.75 part of dibutyltin dilaurate in 1,519 parts of acetone at 60° C. and the mixture was stirred further at 60° C. until an NCO content of 8.2 wt. % was reached. 1,373 parts of the polyesters from Example 1), component B, dissolved in 421 parts of acetone, 305 parts of dimethylolpropionic acid, component D, and 0.75 part of dibutyltin dilaurate were then added at 40° C. and the mixture was heated up to 60° C., while stirring. When an NCO content of 0.1 wt. % was reached, the mixture was cooled to 40° C., and neutralization with 147 parts of triethylamine followed. The clear solution was introduced into 11,350 parts of water, while stirring. The acetone was then distilled off from the dispersion under a slight vacuum. A UV-curable aqueous polyurethane dispersion 11) according to the invention having a solids content of 40 wt. %, an average particle size of 93 nm and a pH of 8.2 was obtained.

Example 12

Preparation of a UV-Curable Aqueous Polyurethane Dispersion which is not According to the Invention 1,362 parts of the polyester from Example 4), component B, were melted at 65° C. and dissolved in 2,000 parts of acetone. 2,047 parts of 2-hydroxyethyl acrylate, component A, 305 parts of dimethylolpropionic acid, component D, 2,236 parts of 4,4'-diisocyanatodicyclohexylmethane, component E, and 1.5 parts of dibutyltin dilaurate were then added at 40° C. and the mixture was heated up to 60° C., while stirring. Addition of 2,244 parts of Desmodur® N 3300 (HDI trimer, Bayer AG, Leverkusen, DE), component E, followed. When an NCO content of 0.6 wt. % was reached, the mixture was cooled to 40° C., and neutralization with 173 parts of triethylamine followed. The clear solution was introduced into 12,000 parts of water, while stirring. Thereafter, a mixture of 35.5 parts of ethylenediamine, component F, and 100 parts of water was added to the dispersion, while stirring. The acetone was then distilled off from the dispersion under a slight vacuum. A UV-curable aqueous polyurethane dispersion 12) having a solids content of 35 wt. %, an average particle size of 74 nm and a pH of 8.5 was obtained.

Example 13

Preparation of Polyurethane Dispersion 1 from EP-A 704469

47.7 parts of the polyester from Example 5), 54.6 parts of 2-hydroxyethyl acrylate, 22.7 parts of 1,4-butanediol, 0.2 part of p-methoxyphenol, 0.6 part of 2,6-di-tert-butyl-p-cresol and 0.14 part of dibutyltin dilaurate were dissolved in 116 parts of acetone and the solution was heated up to 60° C. A mixture of 111 parts of isophorone-diisocyanate and Desmodur® N 3300 (HDI trimer, Bayer AG, Leverkusen DE) was metered in over a period of 2 hours, while stirring. After one and a half hours, the theoretical NCO content of 1.75 wt. % was reached, 43.5 parts of a 40% strength aqueous PUD salt solution were added over a period of 10 minutes, 329 parts of water were added after a further 20 minutes and the acetone was distilled off from the dispersion under a slight vacuum. A UV-curable aqueous polyurethane dispersion 13) according to EP-A 704469 having a solids content of 36 wt. %, an average particle size of 104 nm and a pH of 8.2 was obtained.

TABLE 1

Formulations for pigmented systems

| | Pigmented lacquers [A-1] and [A-2] (parts by weight) | Clear lacquer [A-3] (parts by weight) |
|---|---|---|
| UV dispersion (adjusted to 40% solids) | 122.00 | 150 |
| Butyl glycol/water (1:1) | 10.00 | 12 |
| Silicone surface additive BYK ® 373[1] | 0.20 | — |
| Wetting agent BYK ® 346[2] | 0.40 | 0.3 |
| Irgacure ® 500[3] | 2.00 | 1.5 |

TABLE 1-continued

Formulations for pigmented systems

| | Pigmented lacquers [A-1] and [A-2] (parts by weight) | Clear lacquer [A-3] (parts by weight) |
|---|---|---|
| Irgacure ® 819 DW[4] | 2.00 | — |
| Defoamer Dehydran 1293[5] | 1.00 | — |
| TiO$_2$ paste Apuis 0062[6] | 49.00 | — |
| Thickening agent BYK ® 425[7] | 2.00 | 0.4 |
| Water | 11.40 | — |
| Total | 200.00 | 164.2 |

See Table 2 for explanations of the footnotes.

TABLE 2

Application and curing conditions for pigmented systems

| | Pigmented lacquers [A-1] | Pigmented lacquers [A-2] | Clear lacquer [A-3] |
|---|---|---|---|
| Substrate | wood | glass | glass |
| Application by knife-coating | box knife, 2 × 150 μm, wet film | box knife, 1 × 150 μm, wet film | box knife, 1 × 150 μm, wet film |
| Deaeration time | 10 min, 50° C. | 10 min, 50° C. | 10 min, 50° C. |
| Curing | 3 m/min (Ga + Hg)[8] | 3.5 m/min[9] (Ga + Hg)[8] | 3.5 m/min[9] (Hg)[8] |

[1]Solution of a polyether-modified hydroxy-functional polydimethylsiloxane from BYK, Wesel, DE
[2]Solution of a polyether-modified polydimethylsiloxane from BYK, Wesel, DE
[3]A mixture of benzophenone and (1-hydroxycyclohexyl) phenyl ketone from Ciba, Lampertheim, DE
[4]Phenyl-bis-(2,4,6-trimethylbenzoyl)-phosphine oxide from. Ciba, Lampertheim, DE
[5]Modified polydimethylsiloxane from Cognis, Düsseldorf, DE
[6]Pigment paste from Heubach, Langelsheim, DE
[7]Solution of a urea-modified polyurethane from BYK, Wesel, DE
[8]UV unit from Barberán, model HOK-6/2 (approx. 80 W/cm)
[9]To test the reactivity, the hardness achieved after curing is measured in pendulum seconds (in accordance with DIN 53157) as a function of various belt speeds. If the pendulum hardness remains at values above 100 pendulum seconds even at the highest belt speed, the coating has an excellent reactivity.

After the UV curing the coated substrates are stored (wood 1 d at 50° C. and glass 1 h at room temperature in a desiccator) and then subjected to the tests.

TABLE 3

Data on the use testing of pigmented systems

| Use testing | Example 6 | Example 7 | Example 8 | Example 9 | Example 10 | Example 12 | Example 13 (EP-A 704 469) |
|---|---|---|---|---|---|---|---|
| Film transparency[10], clear lacquer [A-3] | 4 | 5 | 2 | 4 | 3 | 4 | 5 |
| Storage stability: 50° C./24 h | OK | OK | OK | OK | OK | OK | OK |
| Storage stability: 40° C./28 d | OK | OK | OK | OK | OK | OK | OK |
| Water resistance[11], pigmented lacquer [A-1] | 5 | 5 | 5 | 5 | 5 | 5 | 5 |
| Coffee resistance[11], pigmented lacquer [A-1] | 5 | 4-5 | 3 | 5 | 5 | 2-3 | 3 |
| Ethanol/water (50%) resistance[11], pigmented lacquer [A-1] | 5 | 5 | 4-5 | 5 | 5 | 5 | 4 |
| Red wine resistance[11], pigmented lacquer [A-1] | 5 | 4-5 | 4 | 5 | 5 | 3 | 3 |
| Ethanol resistance (98%)[11], pigmented lacquer [A-1] | 5 | 5 | 4-5 | 4 | 5 | 4-5 | 4 |
| König pendulum hardness, clear lacquer [A-3] after ph. drying | 64 sec | 64 sec | 17 sec | 116 sec | 45 sec | tacky | 31 sec |
| König pendulum hardness, clear lacquer [A-3] after UV curing | 200 sec, 190 sec | 148 sec, 146 sec | 174 sec, 162 sec | 220 sec, 219 sec | 210 sec, 205 sec | 193 sec 188 sec | 158 sec 153 sec |
| König pendulum hardness, pigmented lacquer [A-2] | 150 sec, 143 sec | 188 sec, 185 sec | 109 sec, 88 sec | 199 sec, 196 sec | 172 sec, 169 sec | 118 sec 69 sec | 132 sec 109 sec |

TABLE 3-continued

Data on the use testing of pigmented systems

| Use testing | Example 6 | Example 7 | Example 8 | Example 9 | Example 10 | Example 12 | Example 13 (EP-A 704 469) |
|---|---|---|---|---|---|---|---|
| Blushing after scratching[12], clear lacquer [A-3] | 5 | 5 | 5 | 4 | 4 | 5 | 3 |

[10]The film transparency is evaluated visually after heating a film on a glass plate and subsequent physical drying: Rating 5: clear, no clouding or hazing detectable Rating 4: a slight hazing is detectable at a viewing angle of approx. 10-20° Rating 3: a slight clouding is detectable at a viewing angle of approx. 45-80° Rating 2: significant clouding Rating 1: matt surface or granulated surface
[11]The resistance properties are evaluated by visual inspection after exposure for 16 hours: Rating 5: No visible changes (no damage) Rating 4: Slight change in shine or colour shade, only visible if the light source reflects in the test surface on or close to the marking and is reflected directly to the eye of the viewer, or some demarcated markings just detectable (swelling ring detectable, or no softening detectable with the fingernail). Rating 3: Slight marking to be seen from several viewing angles, for example an almost complete circle or circular area just detectable (swelling ring detectable, scratch tracks of the fingernail detectable) Rating 2: Severe marking, but the surface structure is largely unchanged. (closed swelling ring, scratch tracks detectable). Rating 1: Severe marking, but the surface structure is largely unchanged, marking can be scratched through to the substrate. Rating 0: Severe marking, the surface structure is changed or the surface material is completely or partly destroyed or the filter paper adheres to the surface.
[12]The blushing after scratching is tested by scratching by means of a coin. If no blushing at all is detectable at the scratching point, this result is evaluated as excellent (rating 5).

TABLE 4

Formulations for clear lacquer systems

| | Clear lacquer [A-4, A-5] (parts by weight) |
|---|---|
| UV dispersion (adjusted to 40% solids) | 150 |
| Butyl glycol/water (1:1) | 12 |
| Irgacure ® 500[3] | 1.5 |
| Wetting agent BYK ® 346[2] | 0.3 |
| Thickening agent BYK ® 425[7] | 0.4 |
| Total | 164.2 |

See Table 2 for explanations of the footnotes

TABLE 5

Application and curing conditions for clear lacquer systems

| | Clear lacquer [A-4] | Clear lacquer [A-5] |
|---|---|---|
| Substrate | Wood | glass |
| Application by knife-coating | box knife, 1 × 150 μm, wet film | box knife, 1 × 150 μm, wet film |
| Deaeration time | 10 min, 50° C. | 10 min, 50° C. |
| Curing | 3.5 m/min[9] (Hg)[8] | 3.5 m/min[9] (Hg)[8] |

See Table 2 for explanations of the footnotes

After the UV curing the coated substrates are stored (glass 1 h at room temperature in a desiccator) and then subjected to the tests.

TABLE 6

Data on the use testing of clear lacquer systems

| Use testing | Example 6 | Example 13 (EP-A 704 469) |
|---|---|---|
| Film transparency[10], clear lacquer [A-5] | 5 | 5 |
| Storage stability: 50° C./24 h | OK | OK |
| Storage stability: 40° C./28 d | OK | OK |
| Water resistance[11], clear lacquer [A-4] | 5 | 5 |
| Coffee resistance[11], clear lacquer [A-4] | 5 | 5 |
| Ethanol/water (50%) resistance[11], clear lacquer [A-4] | 5 | 4 |
| Red wine resistance[11] clear lacquer [A-4] | 5 | 5 |
| Ethanol resistance (98%)[11], clear lacquer [A-4] | 5 | 3 |

TABLE 6-continued

Data on the use testing of clear lacquer systems

| Use testing | Example 6 | Example 13 (EP-A 704 469) |
|---|---|---|
| König pendulum hardness, clear lacquer [A-5] after ph. drying | 64 sec | 31 sec |
| König pendulum hardness, clear lacquer [A-5] after UV curing | 189 sec, 180 sec | 158 sec, 153 sec |
| Blushing after scratching[12], clear lacquer [A-5] | 5 | 3 |

See Table 3 for explanations of the footnotes

In the pigmented formulation, Examples 6) to 10) according to the invention show significantly better resistances to coffee and red wine stains and a better resistance to ethanol compared with Example 12), which is not according to the invention, and Comparison Example 13). Very pronounced physical surface drying and high pendulum hardnesses after radiation curing are furthermore achieved for Examples 6) to 10). Example 12), which is not according to the invention, clearly shows that both the decrease in pendulum hardnesses after physical drying and after radiation curing and the poorer resistances to coffee, red wine and ethanol are to be attributed to the flexibilizing polyester from Example 4), which contains aliphatic di-acids.

Example 8), a UV-curable polyurethane dispersion according to the invention based on a polyester containing phthalic acid, gives a result in the resistances to coffee, red wine and ethanol in the pigmented formulation which is still good, but somewhat poorer compared with Examples 6), 7), 9) and 10). The particular preference for polyesters containing isophthalic acid and/or terephthalic acid for the systems according to the invention is based on this.

In the clear lacquer formulation, Example 6) is superior to Comparison Example 13) in the resistances to ethanol. Higher pendulum hardnesses are furthermore achieved both after physical drying and after radiation curing, without poorer values being obtained in the blushing after scratching.

The invention claimed is:

1. A radiation-curable aqueous dispersion based on polyurethane acrylates consisting of as builder components
   A) one or more compounds of monohydroxy-functional alcohols comprising (meth)acrylate groups,
   B) polyester polyols obtained from components consisting of
      B1) 1,2-Ethanediol, 1,2-propanediol, 1,3-propanediol, neopentyl glycol, trimethylolpropane, glycerol and/or castor oil, and B2) phthalic acid, phthalic anhydride, isophthalic acid and/or terephthalic acid, C) optionally monomeric mono-, di- and/or triols in each case having a molecular weight of from 32 to 240 g/mol, D) one or more compounds having at least one group which is reactive towards isocyanate, and additionally having groups which are nonionic, ionic or capable of the formation of ionic groups, which have a dispersing action for the polyurethane dispersion, E) organic polyisocyanates, and F) optionally mono- and diamines and/or mono- or difunctional amino alcohols compounds, and optionally reactive diluents comprising at least one group which can undergo free radical polymerization.

2. The radiation-curable aqueous dispersion based on polyurethane acrylates according to claim 1, wherein the polyester polyols B) are present in an amount of from 5 to 75 wt. %, and wherein components A to F add up to 100 wt. %.

3. The radiation-curable aqueous dispersion based on polyurethane acrylates according to claim 1, wherein the polyester polyols B) have an OH number of 20-500 mg of KOH/g of substance.

4. The radiation-curable aqueous dispersion based on polyurethane acrylates according to claim 1, wherein the one or more compounds of monohydroxy-functional alcohols comprising (meth)acrylate groups A) comprise 2-hydroxyethyl (meth)acrylate, 2-hydroxypropyl (meth)acrylate, pentaerythritol triacrylate, dipentaerythritol pentaacrylate, the addition product of ethylmethylheptanoic acid glycidyl ester with (meth)acrylic acid and/or technical grade mixtures thereof.

5. The radiation-curable aqueous dispersion based on polyurethane acrylates according to claim 1, wherein B1) is 1,2-ethanediol, 1,2-propanediol, neopentyl glycol or trimethylolpropane; and wherein B2) is isophthalic acid or terephthalic acid.

6. The radiation-curable aqueous dispersion based on polyurethane acrylates according to claim 1, wherein the one or more compounds D) comprise 2-(2-amino-ethylamino) ethanesulfonic acid, 3-(cyclohexylamino)propane-1-sulfonic acid, the addition product of isophoronediamine and acrylic acid, hydroxypivalic acid, dimethylolpropionic acid, triethanolamine, tripropanolamine, N-methyldiethanolamine, N,N-dimethylethanolamine, monofunctional mixed polyalkylene oxide polyethers which contain ≥40 mol % of ethylene oxide units and ≤60 mol % of propylene oxide units, or mixtures thereof.

7. The radiation-curable aqueous dispersion based on polyurethane acrylates according to claim 1, wherein the organic polyisocyanates E) comprise 1,6-hexamethylene-diisocyanate, 1-isocyanato-3,3,5-trimethyl-5-isocyanatomethylcyclohexane (isophorone-diisocyanate or IPDI), 4,4'-diisocyanato-dicyclohexylmethane, homologues or oligomers of 1-isocyanato-3,3,5-trimethyl-5-isocyanatomethylcyclohexane (isophorone-diisocyanate or IPDI) or 4,4'-diisocyanatomethylcyclohexane with biuret, carbodiimide, isocyanurate, allophanate, iminooxadiazinedione and/or uretdione groups, or mixtures thereof.

8. A process for the preparation of the radiation-curable aqueous dispersions based on polyurethane acrylates according to claim 1, comprising a. reacting components A-D with component E in one or more reaction steps wherein, optionally, a neutralizing agent is added before, during or after the preparation of the prepolymer to produce the ionic groups necessary for the dispersing operation, b. dispersing the product of the reaction by adding water to the prepolymer or transferring the prepolymer into an aqueous reservoir, wherein, optionally, component F is added before, during or after the dispersing.

9. The process for the preparation of the radiation-curable aqueous dispersions based on polyurethane acrylates according to claim 8, wherein the molar ratios of isocyanate groups in (E) to groups in (A), (B), (C) and (D) which are reactive towards isocyanates are from 0.8:1 to 2.5:1.

10. The process according to claim 8, further comprising admixing one or more reactive diluents with at least one group which can undergo free radical polymerization.

11. A coating, lacquer or adhesive obtained from the radiation-curable aqueous dispersion according to claim 1.

12. A coating composition comprising the radiation-curable aqueous dispersions based on polyurethane acrylate according to claim 1, and crosslinking agents based on amino resins, blocked polyisocyanates, non-blocked polyisocyanates, polyaziridines and/or polycarbodiimides, and/or one or more further dispersions.

13. A substrate coated with coating composition according to claim 12.

14. The radiation-curable aqueous dispersion based on polyurethane acrylates according to claim 1, wherein C) is present.

* * * * *